United States Patent
Bes Torres

(10) Patent No.: US 11,754,460 B2
(45) Date of Patent: Sep. 12, 2023

(54) SYSTEM AND METHOD INTENDED TO ESTIMATE A GOOD DISTRIBUTION OF LOADING ONBOARD AN AIRCRAFT

(71) Applicant: Airbus (S.A.S.), Blagnac (FR)

(72) Inventor: Jorge Antonio Bes Torres, Blagnac (FR)

(73) Assignee: Airbus (S.A.S.), Blagnac (FR)

( * ) Notice: Subject to any disclaimer, the term of this patent is extended or adjusted under 35 U.S.C. 154(b) by 282 days.

(21) Appl. No.: 17/208,355

(22) Filed: Mar. 22, 2021

(65) Prior Publication Data
US 2021/0293650 A1    Sep. 23, 2021

(30) Foreign Application Priority Data

Mar. 23, 2020 (FR) ..................................... 2002802

(51) Int. Cl.
*G01M 1/12* (2006.01)
*G01G 19/07* (2006.01)

(52) U.S. Cl.
CPC ............ *G01M 1/125* (2013.01); *G01G 19/07* (2013.01)

(58) Field of Classification Search
CPC ......... G01M 1/12; G01M 1/125; G01G 19/07
USPC .......................................................... 701/124
See application file for complete search history.

(56) References Cited

U.S. PATENT DOCUMENTS

| | | | |
|---|---|---|---|
| 2,856,127 A | 10/1958 | Kolisch et al. | |
| 4,463,428 A * | 7/1984 | Gilliam | G01G 19/07 73/65.06 |
| 4,935,885 A * | 6/1990 | McHale | G01M 1/125 177/199 |
| 6,308,131 B1 | 10/2001 | Fox | |
| 7,198,227 B2 * | 4/2007 | Olin | G06Q 10/08 244/137.1 |
| 7,375,293 B2 * | 5/2008 | Beshears | G01G 23/3735 177/25.14 |
| 8,068,975 B2 * | 11/2011 | Jensen | G01M 1/125 701/3 |
| 8,340,892 B2 * | 12/2012 | Long | G01G 19/07 73/65.06 |
| 8,571,814 B2 * | 10/2013 | Zhao | B64F 5/60 702/41 |
| 10,752,363 B1 * | 8/2020 | Moore | G06Q 10/043 |
| 10,913,528 B1 * | 2/2021 | Moore | B64C 29/0033 |
| 11,001,392 B1 * | 5/2021 | Kern | G01G 23/002 |

(Continued)

FOREIGN PATENT DOCUMENTS

| | | | | |
|---|---|---|---|---|
| CA | 3048689 A1 * | 1/2020 | | B64D 45/00 |
| WO | WO-2021102441 A1 * | 5/2021 | | B64C 1/22 |

OTHER PUBLICATIONS

French Search Report for Application No. 2002802 dated Nov. 30, 2020.

*Primary Examiner* — Atul Trivedi
(74) *Attorney, Agent, or Firm* — KDW Firm PLLC

(57) ABSTRACT

A system to estimate the good distribution of loading onboard an aircraft capable of carrying out a target mission. The system includes at least one operability index determination module, a module for verifying whether the distribution of loading onboard the aircraft is considered to be a good distribution by comparing the operability index of the target mission with a predetermined operability index threshold. The determination of the operability index makes it possible to know whether the aircraft can carry out a target mission in good conditions.

10 Claims, 2 Drawing Sheets

(56) References Cited

U.S. PATENT DOCUMENTS

| | | | | |
|---|---|---|---|---|
| 2004/0226996 | A1* | 11/2004 | Stefani | G01G 19/44 |
| | | | | 235/384 |
| 2008/0300738 | A1* | 12/2008 | Coulmeau | G05D 1/0005 |
| | | | | 701/3 |
| 2008/0312870 | A1* | 12/2008 | Cox | B64C 25/405 |
| | | | | 244/135 A |
| 2010/0274418 | A1* | 10/2010 | Coulmeau | G06Q 20/00 |
| | | | | 701/31.4 |
| 2011/0087424 | A1* | 4/2011 | Long | G01G 19/07 |
| | | | | 701/124 |
| 2012/0221235 | A1* | 8/2012 | PrudHomme-Lacroix | |
| | | | | G06Q 10/08 |
| | | | | 701/124 |
| 2015/0100227 | A1* | 4/2015 | Nance | B64D 45/00 |
| | | | | 701/124 |
| 2016/0195447 | A1* | 7/2016 | Nance | G01G 19/07 |
| | | | | 701/124 |
| 2016/0209290 | A1* | 7/2016 | Shue | B64C 29/0033 |
| 2018/0354610 | A1* | 12/2018 | Kneuper | B64C 17/10 |
| 2019/0031331 | A1* | 1/2019 | McCullough | B64D 27/24 |
| 2019/0315471 | A1* | 10/2019 | Moore | B64C 17/02 |
| 2020/0070960 | A1* | 3/2020 | Parker | G01M 1/127 |
| 2021/0284333 | A1* | 9/2021 | Windisch | B64C 29/0066 |
| 2021/0293650 | A1* | 9/2021 | Bes Torres | G01M 1/125 |
| 2021/0300527 | A1* | 9/2021 | Thalheimer | B64C 29/0025 |
| 2022/0026260 | A1* | 1/2022 | Nance | G01G 19/44 |
| 2022/0048629 | A1* | 2/2022 | Noshari | B60N 2/002 |
| 2022/0284531 | A1* | 9/2022 | Gariel | G06Q 10/0633 |
| 2022/0358517 | A1* | 11/2022 | Nance | G06Q 30/018 |

\* cited by examiner

SYSTEM AND METHOD INTENDED TO ESTIMATE A GOOD DISTRIBUTION OF LOADING ONBOARD AN AIRCRAFT

CROSS-REFERENCE TO RELATED APPLICATION

This application claims priority to French patent application number 20 0802, filed on Mar. 23, 2020, the entire disclosure of which is incorporated by reference herein.

TECHNICAL HELD

The disclosure herein relates to a system that makes it possible to estimate a good distribution of loading onboard an aircraft.

BACKGROUND

The distribution of a loading onboard an aircraft is an important element for the aircraft to be able to carry out a mission in good conditions.

At the present time, the loading onboard an aircraft is measured using a loading success factor. This factor is an indicator that makes it possible to assess the possibility of loading. It is determined from simulated missions by the ratio between a number of successful missions and a total number of missions. However, this factor does not make it possible to estimate the good distribution of a loading in order for the aircraft to be able to carry out a mission in good conditions.

SUMMARY

An object of the disclosure herein is to overcome this drawback by a method and a system that make it possible to estimate a good distribution of loading onboard an aircraft capable of carrying out a target mission.

To this end, the disclosure herein relates to a method intended to estimate the distribution of loading onboard an aircraft.

According to the disclosure herein, the method comprises the following steps:
  a step of determination of an operability index, implemented by an operability index determination module, consisting in or comprising determining an operability index for the target mission, the operability index being determined for a distribution of loading capable of being loaded on the aircraft, the operability index being determined at least on the basis of load limitation characteristics of the aircraft, at least one parameter capable of influencing the distribution of loading onboard the aircraft and a range of possible positions of the center of gravity of the aircraft for a predetermined weight of the aircraft on take-off;
  a verification step, implemented by a verification module, consisting in or comprising verifying whether the aircraft is capable of carrying out the target mission based on a comparison of the operability index of the target mission with a predetermined operability index threshold, the distribution of loading being considered to be a good distribution for the target mission if the operability index of the target mission is greater than or equal to the predetermined operability index threshold.

Thus by virtue of the operability index, it is possible to know whether the target mission will be able to be carried out in good conditions by virtue of a good distribution of the loading.

According to a first embodiment, the operability index corresponds to a loading flexibility index, the loading flexibility index being equal to a percentage loading which can be added from the front to the rear of the aircraft or from the rear to the front of the aircraft without that prejudicing the ability of the aircraft to carry out the target mission.

According to a second embodiment, the operability index corresponds to a loading control index, the loading control index being equal to a percentage range of possible positions of the center of gravity of the aircraft for a predetermined weight of the aircraft on take-off.

According to a third embodiment, the operability index corresponds to a loading index, the loading index being equal to the square root of the product of a loading flexibility index and a loading control index, the flexibility index being equal to a percentage loading which can be added from the front to the rear of the aircraft or from the rear to the front of the aircraft without that prejudicing the ability of the aircraft to carry out the target mission, the loading control index being equal to a percentage range of possible positions of the center of gravity of the aircraft for a predetermined weight of the aircraft on take-off.

Advantageously, the step of determination of the operability index is preceded by a collection step, implemented by a collecting module, consisting in or comprising collecting the parameter or parameters capable of influencing the distribution of loading onboard the aircraft.

For example, the parameter or parameters capable of influencing the distribution of loading onboard the aircraft comprise at least one of the following parameters:
  a weight without fuel onboard the aircraft,
  a position of the center of gravity of the aircraft without fuel onboard the aircraft,
  a weight with a loading onboard the aircraft,
  a weight with baggage onboard the aircraft,
  a payload of the aircraft,
  a weight on take-off of the aircraft,
  a position of the center of gravity on take-off of the aircraft,
  a weight of the fuel onboard,
  a weight of the aircraft empty,
  a position of the center of gravity of the aircraft when empty,
  a weight of the passengers installed in a first zone Z1 in the cabin of the aircraft AC,
  a weight of the passengers installed in a second zone Z2 in the cabin of the aircraft AC,
  a weight of the passengers installed in a third zone Z3 in the cabin of the aircraft AC.

The disclosure herein relates also to a system intended to estimate the good distribution of loading onboard an aircraft capable of carrying out a target mission.

According to the disclosure herein, the system comprises;
  an operability index determination module configured to determine an operability index for the target mission, the operability index being determined for a distribution of loading capable of being loaded on the aircraft, the operability index being determined at least on the basis of load limitation characteristics of the aircraft, at least one parameter capable of influencing the distribution of loading onboard the aircraft and a range of possible positions of the center of gravity of the aircraft for a predetermined weight of the aircraft on take-off;
  a verification module configured to verify whether the aircraft is capable of carrying out the target mission based on a comparison of the operability index of the mission with a predetermined operability index threshold, the distribution being considered to be a good distribution for the target mission if the operability index of the target mission is greater than or equal to the predetermined operability index threshold.

According to a first embodiment, the operability index corresponds to a loading flexibility index, the loading flexibility index being equal to a percentage loading which can be added from the front to the rear of the aircraft or from the rear to the front of the aircraft without that prejudicing the ability of the aircraft to carry out the target mission.

According to a second embodiment, the operability index corresponds to a loading control index, the loading control index being equal to a percentage range of possible positions of the center of gravity of the aircraft for a predetermined weight of the aircraft on take-off.

According to a third embodiment, the operability index is equal to the square root of the product of a loading flexibility index and a loading control index, the flexibility index being equal to a percentage loading which can be added from the front to the rear of the aircraft or from the rear to the front of the aircraft without that prejudicing the ability of the aircraft to carry out the target mission, the loading control index being equal to a percentage range of possible positions of the center of gravity of the aircraft for a predetermined weight of the aircraft on take-off.

Advantageously, the system further comprises a collecting module configured to collect the parameter or parameters capable of influencing the distribution of loading onboard the aircraft.

BRIEF DESCRIPTION OF DRAWINGS

The disclosure herein, with its features and advantages, will emerge more clearly on reading the description given with reference to the attached drawings in which.

DETAILED DESCRIPTION

Figure 1:
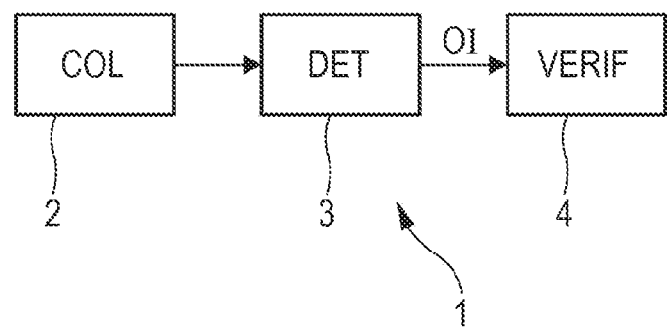
FIG. 1 schematically represents the system intended to estimate the good distribution of loading onboard an aircraft capable of carrying out a target mission according to an embodiment.

The system 1 intended to estimate the good distribution of loading onboard an aircraft capable of carrying out a target mission (called "system" hereinafter in the description) is schematically represented in FIG. 1. The system 1 is intended to be used for an aircraft; in particular a transport airplane.

The system 1 comprises an operability index determination module DET 3 (DET for "determination module") configured to determine an operability index OI for the target mission.

The target mission includes at least a number of passengers capable of embarking onboard the aircraft AC, a weight of baggage per passenger and a weight of fuel capable of being loaded onboard the aircraft AC, The mission can also include airline rules.

The operability index OI is determined for a target mission that can be carried out by the aircraft AC. The operability index OI is determined at least on the basis of load limitation characteristics of the aircraft AC, at least one parameter capable of influencing the distribution of loading onboard the aircraft AC and a range of possible positions of the center of gravity of the aircraft AC for a predetermined weight of the aircraft AC on take-off.

The system 1 can also comprise a collecting module COL 2 (COL for "collecting module") configured to collect the parameter or parameters capable of influencing the distribution of loading onboard the aircraft AC. The parameters capable of influencing the distribution of loading onboard can be collected from sensors installed onboard the aircraft AC or parameters input by an operator.

The parameter or parameters capable of influencing the distribution of loading onboard the aircraft AC can comprise at least one of the following parameters, alone or in combination:
  a weight without fuel or ZFW ("Zero Fuel Weight") onboard the aircraft AC,
  a position of the center of gravity of the aircraft AC without fuel onboard or ZFWCG ("Zero Fuel Weight Center of Gravity") of the aircraft AC,
  a weight with a loading onboard the aircraft AC,
  a weight with baggage onboard the aircraft AC,
  a payload PL of the aircraft AC which corresponds to the sum of the weight of passengers, the weight of baggage and the weight of the freight,
  a weight on take-off or TOW ("Take-Off Weight") of the aircraft AC,
  a position of the center of gravity on take-off or CGTOW of the aircraft AC ("Center of Gravity Take-Off Weight"),
  a weight of the fuel onboard F,
  a weight of the aircraft empty or OWE ("Operating Weight Empty"),
  a position of the center of gravity of the aircraft AC when empty or OWECG ("Operating Weight Empty Center of Gravity"),
  the weight of the passengers installed in a zone Z1 in the cabin of the aircraft AC,
  the weight of the passengers installed in a zone Z2 in the cabin of the aircraft AC,
  the weight of the passengers installed in a zone Z3 in the cabin of the aircraft AC.

Figure 4:
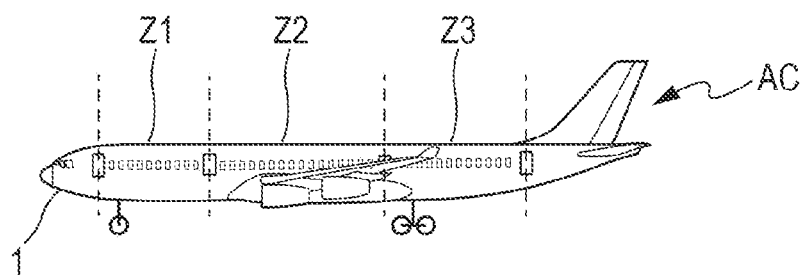
FIG. 4 represents an aircraft intended to carry out a target mission and on which is represented an example of passenger distribution zones.

FIG. 4 represents, by way of example, zones Z1, Z2 and Z3 of the cabin of the aircraft AC. In the example of FIG. 4, the zone Z1 corresponds to the part of the cabin contained between the first door (starting from the front of the aircraft AC) and the second door. The zone Z2 corresponds to the part between the second door and the third door. The zone Z3 corresponds to the part between the third door and the fourth door.

Parameters capable of influencing the distribution of loading concerning the target mission can be input by an airline operations manager. The manager can inform the system 1, using an input device of the collecting module 2, as to the number of passengers, the weight of baggage per passenger and the weight of fuel that can be loaded on the aircraft for the mission to be carried out.

As examples, the pilot can give information on the following missions:
  Mission 1: 170 passengers, 12 kg of baggage per passenger and 80% of fuel compared to the total tank capacity of the aircraft, Mission 2: 190 passengers, 20 kg of baggage per passenger and 50% of fuel compared to the total tank capacity of the aircraft, Mission 3: 250 passengers, 25 kg of baggage per passenger and 40% of fuel compared to the total tank capacity of the aircraft, Mission 4: 220 passengers, 30 kg of baggage per passenger and 60% of fuel compared to the total tank capacity of the aircraft.

The system also comprises a verification module VERIF 4 (VERIF for "verification module") configured to verify whether the aircraft AC is capable of carrying out the target mission based on a comparison of the operability index OI of the target mission with a predetermined operability index threshold. The distribution of loading is considered to be a good distribution for the target mission if the operability index OI of the target mission is greater than or equal to the predetermined operability index threshold.

The operability index threshold is generally set by an operator of the airline which operates the aircraft AC. An airline can decide that a mission cannot be carried out if the operability index is below this operability index threshold.

According to a first embodiment, the operability index OI corresponds to a loading flexibility index LFI. The loading flexibility index is equal to a percentage loading which can be added from the front to the rear of the aircraft AC or from the rear to the front of the aircraft AC without that prejudicing the ability of the aircraft AC to carry out the target mission.

According to a second embodiment, the operability index OI corresponds to a loading control index LCI. The loading control index LCI is equal to a percentage range of possible positions of the center of gravity of the aircraft (AC) for a predetermined weight of the aircraft AC on take-off.

According to a third embodiment, the operability index OI corresponds to a loading index LI. The loading index LI is equal to the square root of the product of the loading flexibility index LFI and a loading control index LCI, according to the following relationship:

$$LI=\sqrt{LFI \times LCI},$$

in which:
LI corresponds to the loading index,
LFI corresponds to the loading flexibility index and
LCI corresponds to the loading control index.

The loading index LI therefore corresponds to a percentage indicating whether a mission can be carried out or not.

Figure 3:
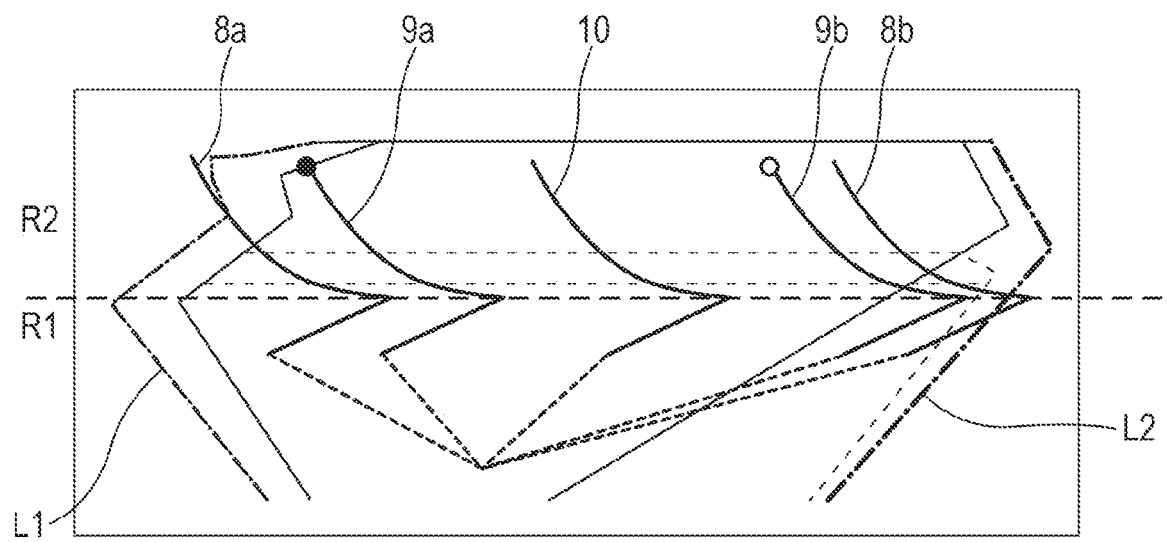
FIG. 3 illustrates a graph representing curves showing the weight onboard the aircraft as a function of the position of the center of gravity of the aircraft.

As an example, FIG. 3 shows a graph representing the position of the center of gravity as a function of the weight of the loading onboard the aircraft AC. The region R1 corresponds to the displacement of the center of gravity when the fuel fills the tanks of the aircraft. The region R2 corresponds to the displacement of the center of gravity when the rest of the loading (baggage, passengers, etc.) is loaded onboard the aircraft AC. The curves L1 and L2 correspond to operability limits. If the center of gravity of the aircraft AC departs from these operability limits, the aircraft AC cannot fly.

The limit L1 corresponds to a limit for which 70% of the loading is at the front of the aircraft AC. The limit L2 corresponds to a limit for which 30% of the loading is at the front of the aircraft AC. The curves 8a, 8b, 9a, 9b and 10 correspond to the positions of the center of gravity for different distributions of the loading. It will be noted that the curves 8a and 8b depart from the limits L1 and L2. Indeed, the curve 8a departs from the limit L1 in the region R2 and the curve 8b departs from the limit L2 at the transition from the region R1 to the region R2. The curves 9a, 9b and 10 remain within the limits L1 and L2. The curves 9a and 9b are the curves which are closest to the limits L1 and L2. Thus, the percentage range of possible positions of the center of gravity corresponds to the percentage between these two curves 9a and 9b.

In the example of FIG. 3, the loading flexibility index LFI is equal to 40% which corresponds to the difference between the limit L1 for which 70% of the loading is at the front of the aircraft AC and the limit L2 for which 30% of the loading is at the front of the aircraft AC.

The operability index OI indicates the percentage loading which can be displaced without the operability of the mission being affected. Thus, if the operability index is high, for example 60%, that means that the mission allows for an easy loading because 60% of the loading can be displaced. However, there is a loading which cannot be displaced which corresponds to the remaining 40% of the example. When the operability index OI is equal to 0%, the aircraft AC cannot carry out the mission, because no distribution of loading is acceptable. When the operability index is equal to 100%, any distribution of loading is possible to carry out the mission.

Before a take-off, an operator of the airline operating the aircraft AC signs a document called "load and trim sheet". This document indicates the exact loading onboard the aircraft AC and whether the flight can be carried out. The operability index OI provides additional information. Indeed, the airline can anticipate the difficulty in loading the aircraft AC. If the operability index OI is high, the airline knows that the loading will be easy to distribute for the mission. However, if the operability index OI is low, the airline can provide for a reduction of the loading in order for the mission to be carried out. For example, the reduction of loading can be performed by limiting the quantity of baggage per passenger, by limiting the loading, etc.

As a nonlimiting example, a mission cannot be carried out if the operability index OI is less than 15%. A mission can be carried out if the operability index OI is greater than or equal to 15©, The operability index threshold is therefore equal to 15% in this example. When the operability index is greater than or equal to 15% and less than 25%, the mission can be carried out, but it remains limited in the possible distribution of the loading. When the operability index OI is greater than or equal to 25% and less than 50%, the mission can be carried out with a greater flexibility of the distribution of loading. When the operability index is greater than or equal to 50% and less than 85%, the mission can be carried out with even greater flexibility of the distribution of loading. When the operability index OI is greater than or equal to 85%, the mission can be carried out with total flexibility. The operability index OI thresholds given in the above example are generally set by the operator of the airline which operates the aircraft AC.

Figure 2:
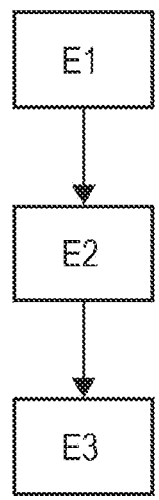
FIG. 2 schematically represents the method intended to estimate the good distribution of loading onboard an aircraft capable of carrying out a target mission according to an embodiment.

The disclosure herein relates also to a method intended to estimate a good distribution of loading onboard an aircraft AC capable of carrying out a target mission. The method is represented schematically in FIG. 2.

The method comprises the following steps:
a step E2 of determination of an operability index OI, implemented by the operability index determination module 3, consisting in or comprising determining an operability index OI for the target mission, the operability index OI being determined for a distribution of loading that can be loaded on the aircraft AC, the operability index OI being determined at least on the basis of load limitation characteristics of the aircraft AC, at least one parameter capable of influencing the distribution of loading onboard the aircraft AC and a range of possible positions of the center of gravity of the aircraft AC for a predetermined weight of the aircraft AC on take-off, a verification step E3, implemented by the verification module 4, consisting in or comprising verifying whether the aircraft AC is capable of carrying out the target mission based on a comparison of the operability index OI of the target mission with a predetermined operability index threshold, the distribution of loading being considered to be a good distribution for the target mission if the operability index OI of the target mission is greater than or equal to the predetermined operability index threshold.

The step E2 of determination of the operability index can be preceded by a collection step E1, implemented by the collecting module 2, consisting in or comprising collecting the parameter or parameters capable of influencing the distribution of loading onboard the aircraft AC.

The method and the system 1 can be used to modify a distribution of loading onboard the aircraft AC.

The method and the system 1 can also be used:
to modify the structure of the aircraft AC,
to modify the configuration of the cabin of the aircraft AC (seats, cabin monuments, etc.),
to assist the airline in choosing the type of aircraft best suited to a given mission,
to identify the maximum payload which can be loaded per mission.

The subject matter disclosed herein can be implemented in software in combination with hardware and/or firmware. For example, the subject matter described herein can be implemented in software executed by a processor or processing unit. In one exemplary implementation, the subject matter described herein can be implemented using a computer readable medium having stored thereon computer executable instructions that when executed by a processor of a computer control the computer to perform steps. Exemplary computer readable mediums suitable for implementing the subject matter described herein include non-transitory devices, such as disk memory devices, chip memory devices, programmable logic devices; and application specific integrated circuits. In addition, a computer readable medium that implements the subject matter described herein can be located on a single device or computing platform or can be distributed across multiple devices or computing platforms.

While at least one example embodiment of the invention(s) is disclosed herein, it should be understood that modifications, substitutions and alternatives may be apparent to one of ordinary skill in the art and can be made without departing from the scope of this disclosure. This disclosure is intended to cover any adaptations or variations of the example embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A method to estimate a good distribution of loading onboard an aircraft capable of carrying out a target mission, the method comprising:
collecting, from one or more sensor or input device, at least one parameter capable of influencing the distribution of loading onboard the aircraft;
determining a range of possible positions of a center of gravity of the aircraft for a predetermined weight of the aircraft on take-off;
determining an operability index for the target mission, the operability index being determined for a distribution of loading capable of being loaded on the aircraft, the operability index being determined at least on a basis of load limitation characteristics of the aircraft, the at least one parameter capable of influencing the distribution of loading onboard the aircraft, and the range of possible positions of the center of gravity of the aircraft for the predetermined weight of the aircraft on take-off, wherein the operability index indicates a percentage of the loading onboard the aircraft which can be displaced without prejudicing an ability of the aircraft to carry out the target mission; and
verifying whether the aircraft is capable of carrying out the target mission based on a comparison of the operability index of the target mission with a predetermined operability index threshold, the distribution of loading being considered to be a good distribution for the target mission if the operability index of the target mission is greater than or equal to the predetermined operability index threshold.

2. The method according to claim 1, wherein the operability index corresponds to a loading flexibility index, the loading flexibility index being equal to a percentage loading which can be added from a front to a rear of the aircraft or from the rear to the front of the aircraft without that prejudicing ability of the aircraft to carry out the target mission.

3. The method according to claim 1, wherein the operability index corresponds to a loading control index, the loading control index being equal to a percentage range of possible positions of the center of gravity of the aircraft for a predetermined weight of the aircraft on take-off.

4. The method according to claim 1, wherein the operability index corresponds to a loading index, the loading index being equal to a square root of a product of a loading flexibility index and a loading control index, the flexibility index being equal to a percentage loading which can be added from the front to the rear of the aircraft or from the rear to the front of the aircraft without that prejudicing the ability of the aircraft to carry out the target mission, the loading control index being equal to a percentage range of possible positions of the center of gravity of the aircraft for a predetermined weight of the aircraft on take-off.

5. The method according to claim 1, wherein the at least one parameter capable of influencing the distribution of loading onboard the aircraft comprise at least one of parameters of:
a weight without fuel onboard the aircraft;
a position of the center of gravity of the aircraft without fuel onboard the aircraft;
a weight with a loading onboard the aircraft;
a weight with baggage onboard the aircraft;
a payload of the aircraft;
a weight on take-off of the aircraft;
a position of the center of gravity on take-off of the aircraft;
a weight of the fuel onboard;

a weight of the aircraft empty;

a position of the center of gravity of the aircraft when empty;

a weight of the passengers installed in a first zone in a cabin of the aircraft;

a weight of the passengers installed in a second zone in the cabin of the aircraft;

a weight of the passengers installed in a third zone in the cabin of the aircraft.

6. A system to estimate a good distribution of loading onboard an aircraft capable of carrying out a target mission, the system comprising:

a collecting module configured to collect at least one parameter capable of influencing the distribution of loading onboard the aircraft from one or more sensor or input device;

an operability index determination module configured to determine a range of possible positions of a center of gravity of the aircraft for a predetermined weight of the aircraft on take-off and to determine an operability index for the target mission, the operability index being determined for a distribution of loading capable of being loaded on the aircraft, the operability index being determined at least on a basis of load limitation characteristics of the aircraft, of the at least one parameter capable of influencing the distribution of loading onboard the aircraft, and the range of possible positions of the center of gravity of the aircraft for the predetermined weight of the aircraft on take-off, wherein the operability index indicates a percentage of the loading onboard the aircraft which can be displaced without prejudicing an ability of the aircraft to carry out the target mission; and a verification module configured to verify whether the aircraft is capable of carrying out the target mission based on a comparison of the operability index of the target mission with a predetermined operability index threshold, the distribution of loading being considered to be a good distribution for the target mission if the operability index of the target mission is greater than or equal to the predetermined operability index threshold.

7. The system according to claim 6, wherein the operability index corresponds to a loading flexibility index, the loading flexibility index being equal to a percentage loading which can be added from a front to a rear of the aircraft or from the rear to the front of the aircraft without that prejudicing ability of the aircraft to carry out the target mission.

8. The system according to claim 6, wherein the operability index corresponds to a loading control index, the loading control index being equal to a percentage range of possible positions of the center of gravity of the aircraft for a predetermined weight of the aircraft on take-off.

9. The system according to claim 6, wherein the operability index is equal to a square root of a product of a loading flexibility index and a loading control index, the flexibility index being equal to a percentage loading which can be added from a front to the rear of the aircraft or from the rear to the front of the aircraft without that prejudicing ability of the aircraft to carry out the target mission, the loading control index being equal to a percentage range of possible positions of the center of gravity of the aircraft for a predetermined weight of the aircraft on take-off.

10. The system according to claim 6, wherein the at least one parameter capable of influencing the distribution of loading onboard the aircraft comprise at least one of parameters of:

a weight without fuel onboard the aircraft;

a position of the center of gravity of the aircraft without fuel onboard the aircraft;

a weight with a loading onboard the aircraft;

a weight with baggage onboard the aircraft;

a payload of the aircraft;

a weight on take-off of the aircraft;

a position of the center of gravity on take-off of the aircraft;

a weight of the fuel onboard;

a weight of the aircraft empty;

a position of the center of gravity of the aircraft when empty;

a weight of the passengers installed in a first zone in a cabin of the aircraft;

a weight of the passengers installed in a second zone in the cabin of the aircraft;

a weight of the passengers installed in a third zone in the cabin of the aircraft.

\* \* \* \* \*

UNITED STATES PATENT AND TRADEMARK OFFICE
CERTIFICATE OF CORRECTION

| | | |
|---|---|---|
| PATENT NO. | : 11,754,460 B2 | Page 1 of 1 |
| APPLICATION NO. | : 17/208355 | |
| DATED | : September 12, 2023 | |
| INVENTOR(S) | : Jorge Antonio Bes Torres | |

It is certified that error appears in the above-identified patent and that said Letters Patent is hereby corrected as shown below:

In the Specification

Column 1, Line 9: "number 20 0802" should be -- number 20 02802 --.

Column 6, Line 40: "equal to 15©," should be -- equal to 15%. --.

Signed and Sealed this
Fifth Day of August, 2025

Coke Morgan Stewart
*Acting Director of the United States Patent and Trademark Office*